Aug. 15, 1967     D. D. BAKER     3,336,452

FIRING ENERGY INDICATOR

Filed Nov. 10, 1965

INVENTOR.
David D. Baker
BY
Charles C. Haase
ATTORNEY 3,336,452
FIRING ENERGY INDICATOR
David D. Baker, King of Prussia, Pa., assignor to Atlas Chemical Industries, Inc., Wilmington, Del., a corporation of Delaware
Filed Nov. 10, 1965, Ser. No. 507,088
2 Claims. (Cl. 200—121)

The present invention relates to a visual indicator and more particularly to a visual indicator containing a pressure producing means which can be activated by electrical energy.

In circuitry used in missiles and satellites explosive switches and actuators are used which are actuated by squibs that are initiated by means of electrical energy. The explosive switches and actuators that are used in such systems are frequently completely encased in metal or other suitable material in such a manner that the inner components are not visible. Therefore, on external inspection of these switches it is not possible to determine whether or not the subject switches have been actuated.

It is an object of the present invention to provide a firing indicator which may be connected in appropriate circuitry and which will provide a ready visible indication of whether or not sufficient electrical energy has passed through the circuit to actuate any switches connected therein.

Another object of this invention is to provide a method of monitoring containers of electrical explosively actuatable switches and actuators to indicate the presence of electromagnetic energy or spurious electrical current of such intensity sufficient to initiate such switches and actuators.

Other objects will become apparent to those skilled in the art upon reading of the following description.

The visible indicator of this invention is comprised of a tubular housing having disposed within its rear portion a closing means and a seal slidably mounted. Between the said closing means and said seal is positioned an electric initiator pressure producing means, so as to permit exertion of pressure against said seal and said closing means. A translucent window or lens closes the forward end of said housing. A colored disc is slidably arranged within said housing, between the said seal and said window, having its one face nearest the said window or forward face coated with a suitable wetting material. The coated side of the said colored disc is spaced from said translucent lens closing the forward end of the tubular housing.

Upon exertion of pressure by said pressure producing means the said coated colored disc is driven into contact with the inner surface of said translucent lens whereby the said translucent lens is wetted. Any substance capable of wetting said translucent lens may be used as the coating material, for example, petroleum waxes, synthetic waxes, natural waxes, silicone greases, animal oils, mineral oils, vegetable oils, soaps, synthetic and natural resin varnishes and oleoresinous materials or combinations thereof. A suitable wetting material may also be selected from a group of plasticizers such as tricresyl phosphate, glycerin, diethylene glycol, dibutyl phthalate and other well-known resin plasticizers. The slidable coated colored disc is not visible from outside the tubular housing until driven into contact with the said translucent lens. The wetting material or coating on the front of the colored disc causes the translucent material to become transparent on contact. When this contact is made the color of the disc is seen through the translucent lens indicating a fired condition.

The colored disc may be made of any suitable material. For example, the disc may be made of acrylic or vinyl plastics. Such plastics may be colored by distributing pigments or dyes throughout the resin in a melted state or externally by application of a suitable paint, ink or lacquer. The disc may be any color but preferably a bright color such as red is normally recommended.

The pressure producing means of this invention may be composed of an explosive charge which is fired through the application of electrical energy. For example, a particularly useful pressure producing means is an explosive squib that may be actuated by electrical energy.

In a preferred embodiment of this invention the forward face of the colored disc is coated with a pressure sensitive adhesive so as to establish a strong adhesive bond or locking contact between the colored disc and lens and wet said lens. Thereby, insuring that once the indicator has been exposed to sufficient electrical energy to cause its actuation, it will remain in the after fire position under all usually encountered environmental conditions of vibration, temperature extremes, shock, high spin rates and humidity. Generally, any pressure sensitive adhesive may be used as the coating on the colored disc so long as it will adhere to the translucent lens on contact.

The pressure sensitive adhesives that can be used in the present invention must contain a material which will wet the translucent lens which closes the forward end of said tubular housing. For example, suitable wetting substances are animal, mineral or vegetable oils, resin plasticizers and silicone greases as well as others mentioned above. The tacky portion of such an adhesive may be composed of any type of pressure sensitive adhesive suitable for such a purpose. Suitable pressure sensitive adhesives may contain resins such as, carbohydrate polymers, rubber, rosin, rosin esters, natural resins and synthetic resins. Examples of such adhesives are described in U.S. Patents 2,236,567 and 2,392,639. In most instances, from at least about 2% to about 20% of a wetting substance must be included in such compositions for purposes of the present invention.

The translucent window which closes the forward end of said housing is of such design that normally it is impossible to see through. For example, this effect may be achieved by using a plastic material, such as acrylic or polycarbonate plastics to form the window which has been roughened on the side to be placed within the said tubular housing wherein it may be contacted by said coated colored disc. When such a surface is wetted with oil or other suitable material it will become transparent.

The subject indicator can be used to detect electrical energy in two modes. First, the device can be packed in shipping containers with switches or actuators and inspected when the package arrives at its destination. If the indicator has fired, it indicates that the switches have been exposed to sufficient electromagnetic radiation to fire any switches or actuators in the same container. Second, the indicator can be wired in a circuit with switches or actuators to be monitored. The present indicator may be wired in series to detect current or in parallel to detect voltage. In all cases the resistance of the bridge wire of the indicator must match the resistance of the bridge wire of the devices being monitored. The unique design of the present invention will be apparent from the following description of the invention taken in connection with the accompanying drawings which illustrate a specific embodiment wherein:

Figure 1:
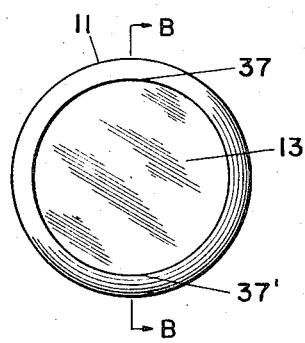
FIGURE 1 is a plan view of the forward end of an embodiment of the present invention.
Figure 2:
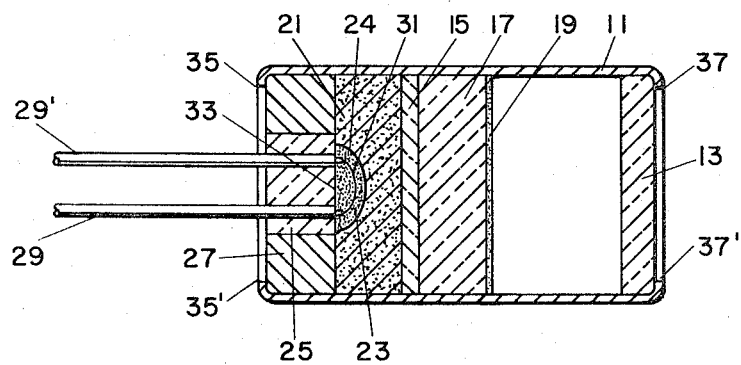
FIGURE 2 is a longitudinal cross-sectional view taken along line B—B of FIGURE 1 with components in before-fire position.

Referring now to the drawings in which like numerals are employed to designate like parts throughout, the numeral 11 refers to an elongated cylindrical housing composed of any material suitable for such purpose, for example, stainless steel or bronze. Numeral 13 refers to a translucent plastic lens which closes the forward end of cylindrical housing 11.

Squib 33 is positioned within the rear end of housing 11. Squib 33 is composed of lead wires 29 and 29′ which are connected to match 23 through bridge wire 31 and gas forming powder charge 21. Lead wires 29 and 29′ enter housing 11 through glass insulating collar 25 positioned inside steel plug 27. Match head 24 may be composed of any suitable material such as lead mononitroresorcinate. Immediately adjacent the forward end of powder charge 21 is plastic seal 15 which is slidably mounted. Seal 15 may be composed of any suitable material, for example, a polyester resin. The rear face of colored disc 17 is in immediate contact with seal 15 and is slidably mounted in tubular housing 11. The opposite face of disc 17 is coated with wetting material 19.

The rear and forward ends of tubular housing 11 are provided with retaining lips 35, 35′ and 37, 37′, respectively, which act to lock squib 33, and lens 13 in position.

Figure 3:
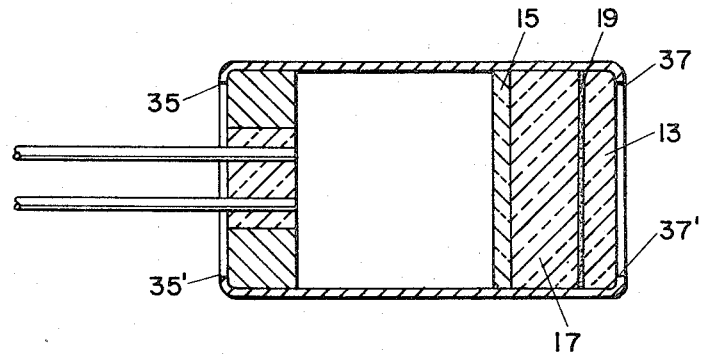
FIGURE 3 is a longitudinal cross-sectional view taken along line B—B of FIGURE 1 with components in the after-fire position.

In normal operations of the present firing indicator electrical energy is brought by means of lead wires 29 and 29′ to squib 33 wherein bridge wire 31 is heated and which in turn ignites match head 24. Match head 24 in turn initiates gas forming charge 21. The gases produced by charge 21 push against plastic seal 15 which in turn pushes colored disc 17 to the right or forward to bring about contact between wetting material 19 and translucent plastic lens 13 in the after-fire position as shown in FIGURE 3.

What is claimed is:
1. A visual indicator comprising:
a tubular housing,
a closing means positioned at one end of said housing,
a seal slidably mounted in said housing proximate to said closing means,
an electric initiator pressure producing means positioned between said closing means and said seal,
a translucent window closing the end of said housing opposite the end wherein said closing means is positioned, and
a colored disc slidably mounted within said housing between said seal and said window having its face nearest said window coated with a wetting material,
whereby upon exertion of pressure by said pressure producing means said coated colored disc is driven into contact with said translucent window so that said wetting material wets said window making it transparent.

2. A visual indicator comprising:
a tubular housing,
a closing means positioned at one end of said housing,
a seal slidably mounted in said housing proximate to said closing means,
an electric squib positioned between said closing means and said seal,
a lens having a roughened inner face closing the end of said housing opposite the end wherein said closing means is positioned, and
a colored disc slidably mounted within said housing between said seal and said lens having its face nearest said lens coated with a pressure sensitive adhesive,
whereby on firing of said squib said adhesive coated colored disc is driven into locking contact with said roughened lens so that said adhesive wets said lens making it transparent.

References Cited
UNITED STATES PATENTS

| 2,234,480 | 2/1941 | Schmidt | 200—119 |
| 2,343,224 | 2/1944 | Powell | 200—121 |
| 2,659,789 | 11/1953 | Lang | 200—121 |
| 2,712,575 | 7/1955 | Kiel | 200—52 |

BERNARD A. GILHEANY, *Primary Examiner.*

H. B. GILSON, *Assistant Examiner.*